(12) United States Patent
Cheng et al.

(10) Patent No.: US 10,714,752 B2
(45) Date of Patent: Jul. 14, 2020

(54) HIERARCHICAL OXYGEN CONTAINING CARBON ANODE FOR LITHIUM ION BATTERIES WITH HIGH CAPACITY AND FAST CHARGING CAPABILITY

(71) Applicants: NEC Corporation, Tokyo (JP); University of Hyogo, Hyogo (JP)

(72) Inventors: Qian Cheng, Tokyo (JP); Noriyuki Tamura, Tokyo (JP); Yoshiaki Matsuo, Hyogo (JP)

(73) Assignees: NEC Corporation, Tokyo (JP); University of Hyogo, Hyogo (JP)

(*) Notice: Subject to any disclaimer, the term of this patent is extended or adjusted under 35 U.S.C. 154(b) by 174 days.

(21) Appl. No.: 16/069,813

(22) PCT Filed: Jan. 13, 2016

(86) PCT No.: PCT/JP2016/000152
§ 371 (c)(1),
(2) Date: Jul. 12, 2018

(87) PCT Pub. No.: WO2017/122230
PCT Pub. Date: Jul. 20, 2017

(65) Prior Publication Data
US 2019/0006675 A1    Jan. 3, 2019

(51) Int. Cl.
*H01M 4/587* (2010.01)
*H01M 4/133* (2010.01)
(Continued)

(52) U.S. Cl.
CPC .............. *H01M 4/587* (2013.01); *C01B 32/20* (2017.08); *H01G 11/22* (2013.01); *H01G 11/32* (2013.01);
(Continued)

(58) Field of Classification Search
CPC ........ C01B 32/20; H01G 11/22; H01G 11/32; H01G 11/38
See application file for complete search history.

(56) References Cited

U.S. PATENT DOCUMENTS 6,143,449 A    11/2000 Kita et al.
7,687,201 B2    3/2010 Kim et al.
(Continued)

FOREIGN PATENT DOCUMENTS

CN    101914703 A    12/2010
CN    103708437 A    4/2014
(Continued)

OTHER PUBLICATIONS

Japanese Notice of Reasons for Refusal issued in Japanese Patent Application No. 2018-536895, dated Jun. 11, 2019, 4 pages.
(Continued)

*Primary Examiner* — Amanda C. Walke
(74) *Attorney, Agent, or Firm* — Wilmer Cutler Pickering Hale and Dorr LLP

(57) ABSTRACT

An anode material for a lithium ion battery, comprising an oxygen-containing carbon where oxygen is in the form of functional groups, the oxygen being distributed gradient from the surface to the inside of the carbon, and the carbon having an interlayer space $d_{002}$ larger than 0.3357 nm; and a porous graphene layer covering the oxygen-containing carbon, the graphene being in the form of monolayer or few-layer graphene.

17 Claims, 4 Drawing Sheets

(51) Int. Cl.

| | |
|---|---|
| *H01M 4/1393* | (2010.01) |
| *H01M 4/04* | (2006.01) |
| *H01G 11/22* | (2013.01) |
| *H01G 11/32* | (2013.01) |
| *H01G 11/38* | (2013.01) |
| *C01B 32/20* | (2017.01) |
| *H01M 4/36* | (2006.01) |
| *H01M 4/62* | (2006.01) |
| *H01M 10/0525* | (2010.01) |
| *H01M 4/02* | (2006.01) |

(52) U.S. Cl.
CPC .......... *H01G 11/38* (2013.01); *H01M 4/0471* (2013.01); *H01M 4/133* (2013.01); *H01M 4/1393* (2013.01); *H01M 4/366* (2013.01); *H01M 4/625* (2013.01); *H01M 10/0525* (2013.01); *H01M 2004/027* (2013.01)

(56) References Cited

U.S. PATENT DOCUMENTS

| | | | |
|---|---|---|---|
| 8,691,442 B2 | 4/2014 | Sheem et al. | |
| 8,795,899 B2 * | 8/2014 | Liu | H01G 11/06 429/209 |
| 10,256,459 B1 * | 4/2019 | Zhamu | H01M 4/366 |
| 10,290,864 B2 * | 5/2019 | Burshtain | H01M 4/608 |
| 10,388,955 B2 * | 8/2019 | Waki | H01M 4/622 |
| 10,424,789 B2 * | 9/2019 | Waki | H01M 4/622 |
| 2010/0190061 A1 | 7/2010 | Green | |
| 2012/0129054 A1 | 5/2012 | Huang et al. | |
| 2016/0056466 A1 | 2/2016 | Tamura et al. | |
| 2019/0157727 A1 * | 5/2019 | Jacob | H01M 4/386 |
| 2019/0273249 A1 * | 9/2019 | Zhamu | H01M 4/133 |
| 2019/0273250 A1 * | 9/2019 | Zhamu | H01M 4/366 |
| 2019/0372151 A1 * | 12/2019 | Zhamu | H01M 4/133 |

FOREIGN PATENT DOCUMENTS

| | | |
|---|---|---|
| EP | 0698933 A1 | 2/1996 |
| JP | H10-188958 A | 7/1998 |
| JP | 2001-302225 A | 10/2001 |
| JP | 2014-130821 A | 7/2014 |
| WO | WO-2008/139157 A1 | 11/2008 |
| WO | WO-2012/039477 A1 | 3/2012 |
| WO | WO-2013/142287 A1 | 9/2013 |
| WO | WO-2014/017252 A1 | 1/2014 |
| WO | WO-2014/083135 A1 | 6/2014 |
| WO | WO-2014/157503 A1 | 10/2014 |

OTHER PUBLICATIONS

International Search Report corresponding to PCT/JP2016/000152 dated Apr. 26, 2016 (2 pages).

* cited by examiner

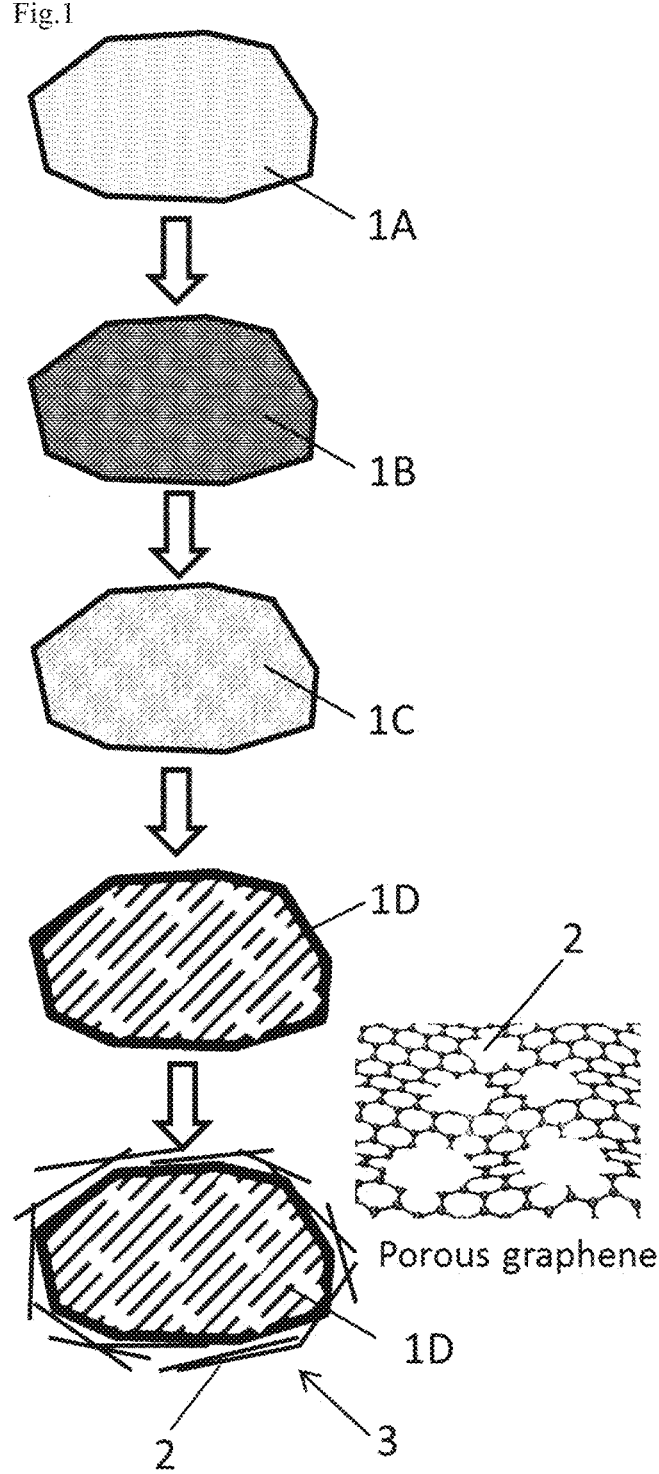
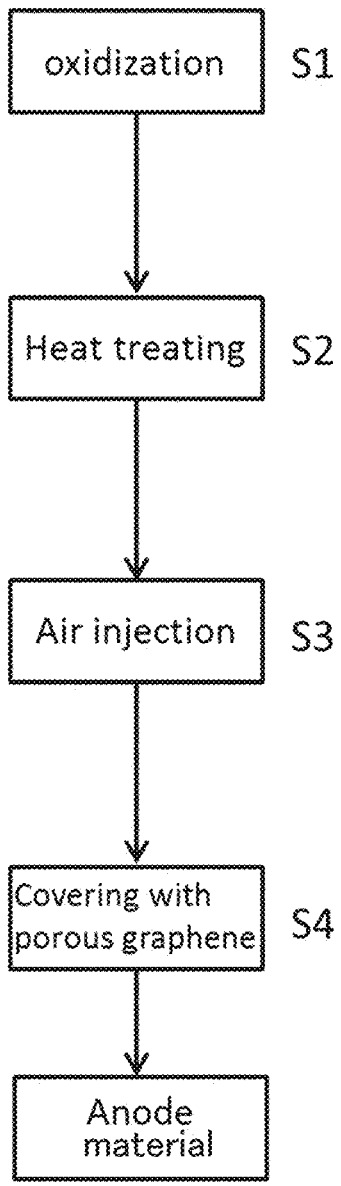

| Peak | Bond | mol% |
|---|---|---|
| 145ppm | Ar-O | 5 |
| 116ppm | Ar-C | 95 |

HIERARCHICAL OXYGEN CONTAINING CARBON ANODE FOR LITHIUM ION BATTERIES WITH HIGH CAPACITY AND FAST CHARGING CAPABILITY

Cross-Reference to Related Applications

This application is a national stage application of International Application No. PCT/JP2016/000152 entitled "Hierarchical Oxygen Containing Carbon Anode for Lithium Ion Batteries with High Capacity and Fast Charging Capability" filed on Jan. 13, 2016, the disclosure of which is hereby incorporated by reference in its entirety.

TECHNICAL FIELD

The present invention relates to an anode material for a lithium ion battery, in particular, a hierarchical oxygen-containing carbon material which can provide a high capacity and fast chargeable anode material of a lithium-ion battery.

BACKGROUND ART

Lithium-ion (Li-ion) batteries have been widely used for portable electronics, and they are being intensively pursued for hybrid vehicles (HVs), plug-in hybrid vehicles (PHVs), electric vehicles (EVs), and stationary power source applications for smarter energy management systems. The greatest challenges in adopting the technology for large-scale applications are the energy density, power density, cost, safety and cycle life of current electrode materials. Energy density as well as the capacity of both anode and cathode is the most important factor for the energy storage systems. The state of the art portable electronics devices, like smart phone which has quad-core processor, 4 GB RAM, 20 mega pixels camera and 4G wireless communication capability, but the battery can only last for one day. It is also the same for the electric vehicles; most cars could have a limited cursing range after a single charge. On the other hands, the charging time as well as the power density is another important characteristic for the battery, especially as the application targets of Li-ion batteries move from small mobile devices to transportation. This is because electrical vehicle (EV) users are hardly to wait more than half an hour to charge their vehicles compared with a refueling period of less than 5 minutes for gasoline cars. The speed of charge greatly depends on the lithiation rate capability of anode materials.

At present, graphite is the most popular and practical anode material for Li-ion batteries because of its low cost, relatively long cycle life, and ease of processing. However, the relative small capacity (<372 mAh/g) and poor rate capability limited their application in high energy and power energy storage systems. CN103708437 and U.S. Pat. No. 8,691,442 are using amorphous carbon based materials such as soft carbon and hard carbon usually have larger interlayer spaces than graphite, offering a faster lithium input rate than graphite. However, soft carbon usually has an even smaller capacity (around 250 mAh/g) than graphite and higher average potential while charging and discharging; it is difficult to be used in Li-ion batteries with high energy density. Hard carbon has a capacity around 400 mAh/g, but its low density, low coulombic efficiency, and high cost, which make it difficult to use in batteries for EVs and plug-in hybrid vehicles (PHVs) at a low enough cost. Other high capacity anode materials, proposed in WO2013/142287, US2012/0129054, WO2008/139157, US2010/0190061, WO2014/083135, CN101914703 and U.S. Pat. No. 7,687,201, are using silicon or tin that is capable of forming an alloy with lithium. However, such an element has even worse lithiation rate capability because of the low kinetics of lithium alloying and the accessibility of lithium ion through thick solid-electrolyte interface (SEI). There are some attempts such as JP2014-130821A, JP2001-302225A and JPH10-188958A, in which some additional elements such as boron are added to increase the capacity of the carbon materials.

CITATION LIST

Patent Literature

PTL 1: CN103708437
PTL 2: U.S. Pat. No. 8,691,442
PTL 3: WO2013/142287
PTL 4: US2012/0129054
PTL 5: WO2008/139157
PTL 6: US2010/0190061
PTL 7: WO2014/083135
PTL 8: CN101914703
PTL 9: U.S. Pat. No. 7,687,201
PTL 10: JP2014-130821A
PTL 11: JP2001-302225A
PTL 12: JPH10-188958A,

SUMMARY OF INVENTION

Technical Problem

However, there is no prior art providing anode materials having fast charging capability and high capacity as well as long cyclability. In summary, there is no anode material that can simultaneously satisfy the high capacity, fast chargeable capability and good cyclability for lithium ion battery up to now.

Solution to Problem

In order to solve these problems, a new material is proposed to improve the capacity and rate capability of anode materials by means of larger interlayer spaces, smaller crystal size, hierarchical oxygen and functional distribution, and alternative lithium storage mechanism for higher capacity and better rate capability.

That is, one aspect of the present invention provides an anode material for a lithium ion battery, including a carbon particle, wherein the carbon particle contains oxygen in the form of functional groups and a content of oxygen is hierarchically distributed in a surface region from the outermost surface of the carbon particle to 15 nm depth with 8.5 wt % to 13.0 wt % and in a remaining inner region with 6.0 wt % to 12.0 wt %, the oxygen content in the surface region is larger than the oxygen content in the inner region; and wherein the carbon particle includes graphite phase with an interlayer space $d_{002}$ larger than 0.3357 nm.

Another aspect of the present invention is to provide a process for fabricating this anode material, which the process includes: (a) preparing a starting carbon particle; (b) wet oxidizing the starting carbon particle by acid treatment and alkaline compound treatment; (c) heat treating the carbon particle oxidized in (b) at 500-1000° C. for 1-24 hours under an inert atmosphere; (d) injecting air with flow rate of 1 to 10 L/min into the atmosphere in (c) so as to cool down to room temperature; (e) mixing the carbon particle cooled in (d) with porous graphenes to obtain a porous graphene covered carbon material.

Still another aspect of the present invention is to provide a lithium ion battery including the above anode material.

Advantageous Effects of Invention

According to the aspect of the present invention, a high capacity and fast chargeable anode material for a lithium ion battery can be provided.

BRIEF DESCRIPTION OF DRAWINGS

FIG. 1 shows a schematic diagram of material fabrication process;

DESCRIPTION OF EMBODIMENTS

Figure 2:
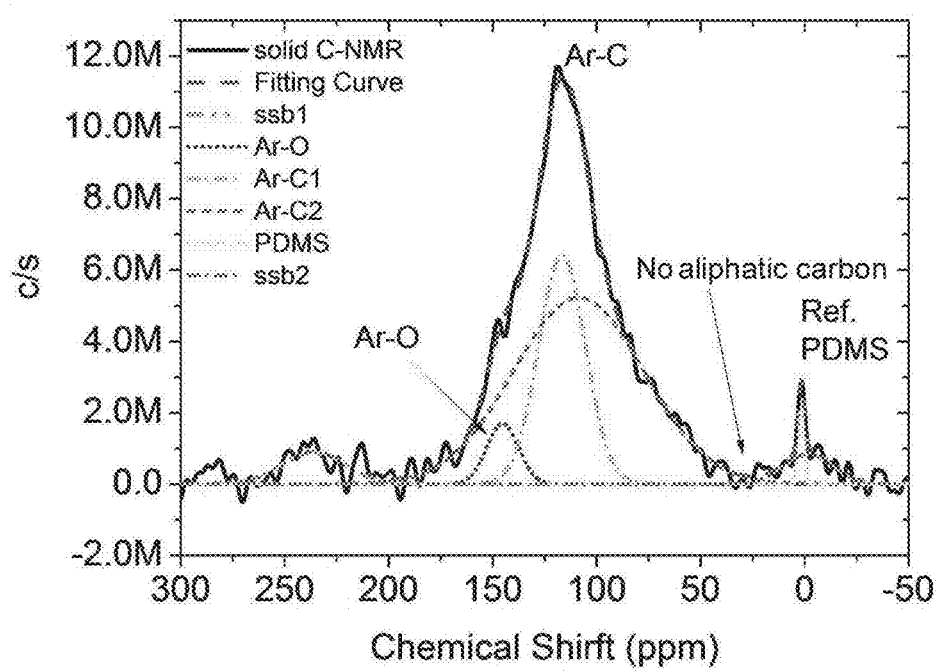
FIG. 2 shows $^{13}$C-NMR spectroscopy of the material in Example 1.

The present invention proposes a new structure of carbon based materials for an anode material of a lithium ion battery. Generally, graphite has a graphene A-B stacking structure with an interlayer space $d_{002}$ of 0.335 nm, which can store one lithium ion every six carbon atoms ($LiC_6$). That is, it is a reason why the theoretical capacity of graphite is 372 mAh/g. Our strategy is to add up some oxygen-containing functional groups or heterogeneity atoms to the interlayer of graphite: for one thing, these functional groups or heterogeneity atoms would expand the interlayer spaces so that lithium ions can intercalate more easily; and for another thing, the functional groups, heterogeneity atoms and interlayer defects would be supposed to have a reversible reaction with lithium ion while charging and discharging, so as to have a much larger capacity than non-treated graphite material. Finally, we have been successful to provide an excellent anode material by introducing hierarchically distributed oxygen in a form of the functional groups from the surface to the core of graphite. In addition, such an oxygen-containing carbon material can be coated with porous graphene for better conductivity to be used as high capacity, fast chargeable anode material for lithium ion battery.

That is the anode material of the present invention includes an oxygen-containing carbon particle where oxygen is in the form of functional groups. The oxygen content of the carbon particle is hierarchically distributed to the depth direction. The content is in a range from 8.5 wt % to 13 wt % in a surface region (hereinafter referred to as "surface") from the outermost surface of the carbon particle to 15 nm depth, and in a range from 6.0 wt % to 12.0 wt % in the remaining inside region (hereinafter referred to as "core part") of the carbon particle. That is, the oxygen content in the surface is higher than that in the core part. Examples of the functional groups include O—C=O, C—O and C=O groups. However, the content of the O—C=O group is preferably in a range from 0.3 wt % to 3 wt %, preferably 1 wt % to 3 wt % in the surface of the carbon particle while the content of the O—C=O group in the core part of the carbon particle is lower than the content in the surface, preferably less than 1 wt % and more preferably less than 0.3 wt %.

The functional group containing oxygen is preferably attached to only the edge of an aromatic skeleton constituting graphene in the carbon particles. The content of the functional group attached on in-plane of the aromatic skeleton is preferably less than 1 wt % of all the functional groups. The functional group on the in-plane of the aromatic skeleton is referred to as in-plane functional group. Increase of the in-plane functional group will damage the crystalline structure of graphite phases, so that the intercalation capacity is decreased.

By containing oxygen, the interlayer space becomes larger than the non-treated graphite. The interlayer space $d_{002}$ can be larger than 0.3357 nm. The upper limit of $d_{002}$ is preferably 0.40 nm or less. The carbon materials with interlayer space larger than 0.40 nm have a low true density.

The oxygen-containing carbon particle may have much lower reversible capacity than the natural graphite due to the low electron conductivity of the materials. However, in the present invention, porous graphene can increase the electron conductivity between carbon particles by covering on the surface of the oxygen-containing carbon particle. The graphene can be monolayer or few-layer graphenes, and it preferably includes at least one single layer graphene. The thickness of graphene covering on the carbon particle can be from 1 nm to 50 nm. The pores on graphene can help the intercalation of lithium ions since the lithium ions can penetrate the porous graphene to intercalate to the carbon particles. The number of the pores can be in a range of 5 to 500 pores per $\mu m^2$. The size of pores can be in a range of 5 nm to 500 nm.

The lithium ion can be stored in the graphene interlayers in a staging phenomenon with the maximum of $LiC_6$ (372 mAh/g). In the contrary, the proposed anode material in the present invention showed a lower intercalation density such as $LiC_x$ ($x \geq 18$) instead of $LiC_x$ ($6 \leq x \leq 12$). The low intercalation density would have a benefit of fast charging and discharging. The extra capacity in addition to intercalation is from the reversible reactions of lithium with oxygen-containing functional groups.

The anode materials can be doped with boron for a larger capacity. The boron atom or boron-containing functional groups can provide a site for a reversible reaction with lithium ions as an additional capacity besides lithium ion intercalation. As a result, the boron doping can increase the capacity of the anode materials.

With Regard to the quantity of the doped boron, it is preferred to have a weight percentage of boron more than 0.5 wt %, more preferably more than 1.5 wt %, most preferably more than 2.5 wt %.

The status of the boron atom can be exotic atom, or boron-containing functional groups, like as C—B, —B(OH)$_2$, —B—N, et al, or both of them.

The anode materials can further include another anode active particle which is capable of absorbing and desorbing lithium ions. Examples of the anode active particles include: (a) metals or semimetals such as silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements, wherein the alloys or intermetallic compounds are stoichiometric or nonstoichiometric; (c) oxides, carbides, nitrides, sulfides, phosphides, selenides, and tellurides of Si, Ge, Sn, Pb, Sb, Bi, Zn, Al, Fe, Ti, Ni, Co, or Cd, and their mixtures or composites; and (d) combinations thereof. There is essentially no constraint on the type and nature of the anode active particles that can be used in practicing the present invention. Among them, metal or semi-metal particles or compound particles of at least one element selected from a group consisting of Si, Sn, Al, Ge and Pb are preferable.

The anode materials may be further coated with a thin layer of carbon or combining with other active particles, such as Si, Sn, etc. For instance, micron-, sub-micron-, or nano-scaled particles or rods, such as $SnO_2$ nano particles, may be decorated on the surface of the graphene coated oxygen-containing carbon material to form a composite material. Then the composite material may be coated with the thin layer of carbon by pyrolysis of hydrocarbons such as sugar or using CVD method. The thickness of the thin layer of carbon can be 2 to 15 nm. The amorphous carbon coating can improve the initial coulombic efficiency.

Fabrication Method

The fabrication procedure of the carbon materials for the present embodiment is described as below with referring to FIG. 1:

(a). Starting carbon particle (raw carbon 1A) is prepared. The starting carbon particle can be selected from carbon materials including graphite phases, such as natural graphite, artificial graphite, soft carbon and hard carbon.

(b). The raw carbon 1A is oxidized by wet oxidation (S1). The wet oxidation can be carried out by acid treatment and alkaline compound treatment. Examples of acids include nitric acid, sulfuric acid, and examples of alkaline compounds include potassium chlorate, potassium permanganate. For example, the raw carbon is firstly mixed with fuming nitric acid ($HNO_3$) on an ice bath. Then potassium chlorate ($KClO_3$) was added thereto. The resultant mixture is stirred for 1 to 24 h on the ice bath and then heated at 30 to 60° C. for 1 to 24 h. After that, the thick paste is diluted with deionized water and filtrated in vacuum. Alternatively, the raw carbon can be mixed with 98% concentrated sulfuric acid and sodium nitrate. Then potassium permanganate ($KMnO_4$) is added and brown mixture is stirred for 10 to 120 min. at 30 to 45° C. After addition of deionized water, temperature is raised to 100° C. The resultant slurry is diluted with water and $H_2O_2$ is added to reduce manganese, consequently color of the mixture is turned to bright yellow. The product is filtrated in vacuum and washed with plenty of water to obtain an oxygen-containing carbon 1B.

(c). The oxygen-containing carbon 1B by step (b) is then heat treated at 500 to 1000° C. for 1 to 24 hours under an inert atmosphere such as $N_2$ atmosphere to obtain a heat treated carbon particle 1C (S2).

(d). Dry air with the flow rate of 1-10 L/min is injected to the atmosphere and the particle 1C is cooled down to room temperature as particle 1D (S3).

(e). The particle 1D is mixed with porous graphenes 2 (S4). The mixing can be carried out in a dry state. According to the mixing, porous graphenes 2 can cover on the surface of particle 1D to obtain final material 3 that can be used as anode materials for high capacity lithium ion batteries.

Synthesis Method for Porous Graphene

Natural graphite is used as the raw material, followed by a Hummer's method to make graphite into graphite oxide (GO). For example, graphite and $NaNO_3$ are first mixed together in a flask. After that, $H_2SO_4$ (95% conc.) is added to the flask with keeping a suspension at a low temperature, e.g., on an ice bath while being stirred. Potassium permanganate is slowly added to the suspension to avoid overheating. The suspension is then stirred at room temperature for a few hours. The color of the suspension will become bright brown. Then, distilled water is added to the flask with stirring. The temperature of the suspension will quickly raise and the color of the suspension will change to yellow. The diluted suspension is then stirred with heating such as at 98° C. for 12 h. $H_2O_2$ (30%) is then added to the suspension. For purification, the solid content can be washed by rinsing with 5% HCl and then deionized water several times. After that the suspension is centrifuged, for example, at 4000 rpm for several minutes. After filtration and drying in a vacuum, the graphite oxide can be obtained as black powders. Thus synthesized graphite oxide is then subjected to thermal shock in 200-500° C. within 20-60 min in $N_2$ atmosphere and followed by a mild oxidation in dry air in 500-800° C. for 30-120 min to activate the surface of the graphite oxide to make a porous graphene precursor. In the next step, the precursor is heated in a reducing atmosphere such as $N_2$ atmosphere to 700-1500° C. with slow temperature raising, e.g., 5° C./min, and the temperature is kept for 1-24 h for a complete reduction of the activated porous graphene precursor into porous graphenes.

Lithium Ion Battery

A lithium ion battery of one exemplary embodiment of the present invention includes positive and negative electrodes, and the negative electrode includes the anode material of the above exemplary embodiment.

As for active materials of the positive electrode (cathode materials), there is also no particular restriction on the type or nature thereof, known cathode materials can be used for practicing the present invention. The cathode materials may be at least one material selected from the group consisting of lithium cobalt oxide, lithium nickel oxide, lithium manganese oxide, lithium vanadium oxide, lithium-mixed metal oxide, lithium iron phosphate, lithium manganese phosphate, lithium vanadium phosphate, lithium mixed metal phosphates, metal sulfides, and combinations thereof. The cathode material may also be at least one compound selected from chalcogen compounds, such as titanium disulfate or molybdenum disulfate. More preferred are lithium cobalt oxide (e.g., $Li_xCoO_2$ where $0.8 \leq x \leq 1$), lithium nickel oxide (e.g., $LiNiO_2$) and lithium manganese oxide (e.g., $LiMn_2O_4$ and $LiMnO_2$) because these oxides provide a high cell voltage. Lithium iron phosphate is also preferred due to its safety feature and low cost. All these cathode materials can be prepared in the form of a fine powder, nano-wire, nano-rod, nano-fiber, or nano-tube. They can be readily mixed with an additional conductor such as acetylene black, carbon black, and ultra-fine graphite particles.

For the preparation of an electrode, a binder can be used. Examples of the binder include polytetrafluoroethylene (PTFE), polyvinylidene fluoride (PVDF), ethylene propylenediene copolymer (EPDM), or styrene-butadiene rubber (SBR). The positive and negative electrodes can be formed on a current collector such as copper foil for the negative electrode and aluminum or nickel foil for the positive electrode. However, there is no particularly significant restriction on the type of the current collector, provided that the collector can smoothly path current and have relatively high corrosion resistance. The positive and negative electrodes can be stacked with interposing a separator therebetween. The separator can be selected from a synthetic resin nonwoven fabric, porous polyethylene film, porous polypropylene film, or porous PTFE film.

A wide range of electrolytes can be used for manufacturing the cell. Most preferred are non-aqueous and polymer gel electrolytes although other types can be used. The non-aqueous electrolyte to be employed herein may be produced by dissolving an electrolyte (salt) in a non-aqueous solvent. Any known non-aqueous solvent which has been employed as a solvent for a lithium secondary battery can be employed. A mixed solvent comprising ethylene carbonate (EC) and at least one kind of non-aqueous solvent whose melting point is lower than that of ethylene carbonate and whose donor number is 18 or less (hereinafter referred to as a second solvent) may be preferably employed as the non-aqueous solvent. This non-aqueous solvent is advantageous in that it is (a) stable against a negative electrode containing a carbonaceous material well developed in graphite structure; (b) effective in suppressing the reductive or oxidative decomposition of electrolyte; and (c) high in conductivity. A non-aqueous solvent solely composed of ethylene carbonate (EC) is advantageous in that it is relatively stable against decomposition through a reduction by a graphitized carbonaceous material. However, the melting point of EC is relatively high, 39-40° C., and the viscosity thereof is relatively high, so that the conductivity thereof is low, thus making EC alone unsuited for use as a secondary battery electrolyte to be operated at room temperature or lower. The second solvent to be used in the mixed solvent with EC functions to make the viscosity of the mixed solvent lowering than that of which EC is used alone, thereby improving an ion conductivity of the mixed solvent. Furthermore, when the second solvent having a donor number of 18 or less (the donor number of ethylene carbonate is 16.4) is employed, the aforementioned ethylene carbonate can be easily and selectively solvated with lithium ion, so that the reduction reaction of the second solvent with the carbonaceous material well developed in graphitization is assumed to be suppressed. Further, when the donor number of the second solvent is controlled to not more than 18, the oxidative decomposition potential to the lithium electrode can be easily increased to 4 V or more, so that it is possible to manufacture a lithium secondary battery of high voltage. Preferable second solvents are dimethyl carbonate (DMC), methyl ethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene and methyl acetate (MA). These second solvents may be employed singly or in a combination of two or more. More desirably, this second solvent should be selected from those having a donor number of 16.5 or less. The viscosity of this second solvent should preferably be 28 cps or less at 25° C. The mixing ratio of the aforementioned ethylene carbonate in the mixed solvent should preferably be 10 to 80% by volume. If the mixing ratio of the ethylene carbonate falls outside this range, the conductivity of the solvent may be lowered or the solvent tends to be more easily decomposed, thereby deteriorating the charge/discharge efficiency. More preferable mixing ratio of the ethylene carbonate is 20 to 75% by volume. When the mixing ratio of ethylene carbonate in a non-aqueous solvent is increased to 20% by volume or more, the solvating effect of ethylene carbonate to lithium ions will be facilitated and the solvent decomposition-inhibiting effect thereof can be improved.

EXAMPLES

Comparative Example 1 (Graphite)

10 g of granulated graphite having diameter of about 20 μm without any treatment was used as a material of Comparative Example 1.

Comparative Example 2

10 g of granulated graphite (the material of Comparative Example 1) was added to 100 ml fuming $HNO_3$ in a beaker with magnetically stirring on an ice bath. Then, 85 g of $KClO_3$ was added thereto. The resultant mixture was further stirred for 48 h on the ice bath and then heated at 60° C. for 10 h. After that, the thick paste was diluted with deionized water and filtrated off in vacuum. Thus treated graphite was then heat treated under $N_2$ atmosphere at 800° C. for 4 h. Then the heat treated graphite was cooled down to room temperature in the same atmosphere. This material was used as a material of Comparative Example 2.

Example 1

Figure 3:
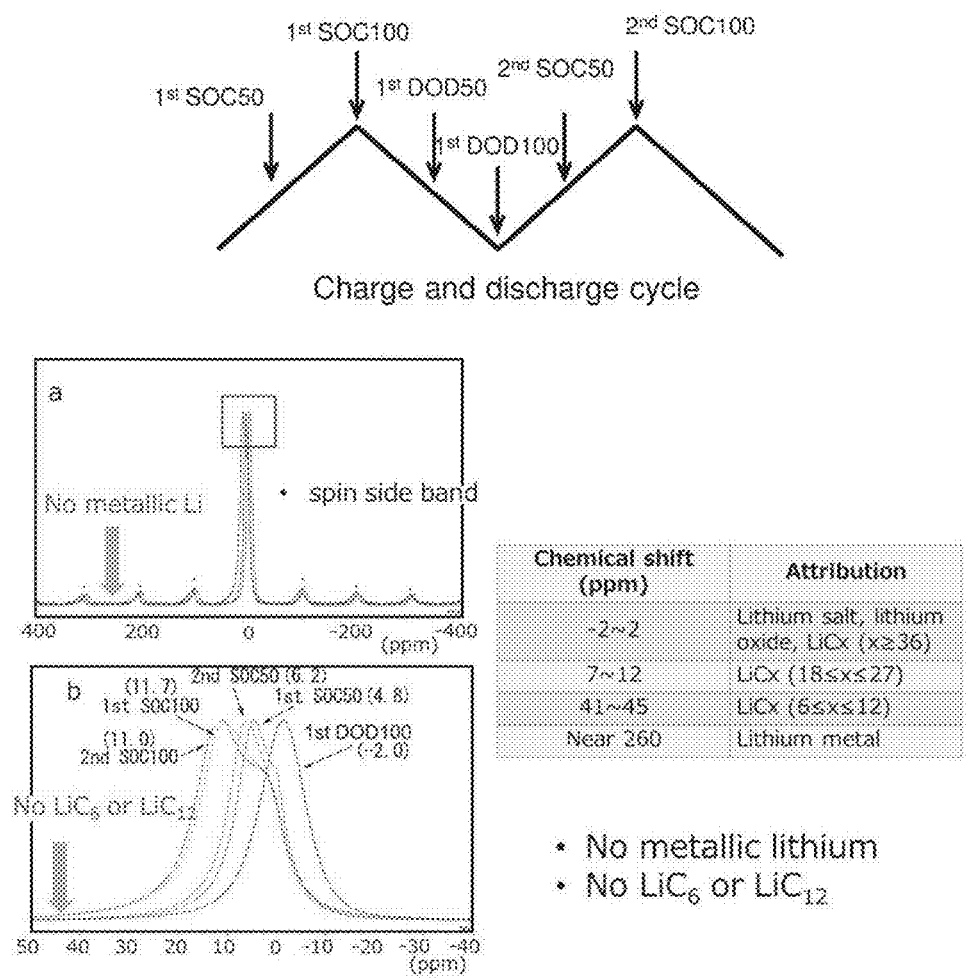
FIG. 3 shows $^{7}$Li-NMR spectroscopy of $1^{st}$ SOC50, $1^{st}$ SOC100, $1^{st}$ DOD50, $1^{st}$ DOD100, $2^{nd}$ SOC50, $2^{nd}$ SOC100 of the material in Example 1.

10 g of granulated graphite (the material Comparative Example 1) was added to 100 ml fuming $HNO_3$ in a beaker with magnetically stirring on an ice bath. Then, 85 g of $KClO_3$ was added thereto. The resultant mixture was further stirred for 48 h on the ice bath and then heated at 60° C. for 10 h. After that, the thick paste was diluted with deionized water and filtrated off in vacuum. Thus treated graphite was then heat treated under $N_2$ atmosphere at 800° C. for 4 h. Then the dry air was injected to the atmosphere with flow rate of 5 L/min and the sample was cooled down to room temperature. This material was used as a material of Example 1. The material was evaluated by $^{13}C$-NMR analysis and the results are shown in FIG. 2. Further, the material was subjected to a lithium intercalation test. The electrodes with as synthesized materials were assembled with a lithium metal coated cooper foil as a half cell. 1M $LiPF_6$ in EC/DEC (3:7) is used as the electrolyte. The cells were charged or discharged to SOC50, DOD50, DOD100 in constant current (CC) in capacity cut mode. SOC100 is obtained in constant current and constant voltage mode with 0.1 C as cut current. The $^{7}Li$-NMR analyses of 1st SOC 50, 1st SOC 100, 1st DOD50, 1st DOD100, 2nd SOC50, 2nd SOC100 are shown in FIG. 3.

Example 2

10 g of granulated graphite (the material of Comparative Example 1) was added to 100 ml fuming $HNO_3$ in a beaker with magnetically stirring on an ice bath. Then, 85 g of $KClO_3$ was added thereto. The resultant mixture was further stirred for 48 h on the ice bath and then heated at 60° C. for 10 h. After that, the thick paste was diluted with deionized water and filtrated off in vacuum. Thus treated graphite was then heat treated under $N_2$ atmosphere at 800° C. for 4 h. Then the dry air was injected to the atmosphere with flow rate of 1 L/min and the sample was cooled down to room temperature. This material was used as a material of Example 2.

Example 3

10 g of granulated graphite (the material of Comparative Example 1) was added to 100 ml fuming $HNO_3$ in a beaker with magnetically stirring on an ice bath. Then, 85 g of KClO$_3$ was added thereto. The resultant mixture was further stirred for 48 h on the ice bath and then heated at 60° C. for 10 h. After that, the thick paste was diluted with deionized water and filtrated off in vacuum. Thus treated graphite was then heat treated under N$_2$ atmosphere at 800° C. for 4 h. Then the dry air was injected to the atmosphere with flow rate of 10 L/min and the sample was cooled down to room temperature. This material was used as a material of Example 3.

Example 4

10 g of granulated graphite (the material of Comparative Example 1) was added to 100 ml fuming HNO$_3$ in a beaker with magnetically stirring on an ice bath. Then, 85 g of KClO$_3$ was added thereto. The resultant mixture was further stirred for 48 h on the ice bath and then heated at 60° C. for 10 h. After that, the thick paste was diluted with deionized water and filtrated off in vacuum. Thus treated graphite was then heat treated under N$_2$ atmosphere at 400° C. for 4 h. Then the dry air was injected to the atmosphere with flow rate of 5 L/min and the sample was cooled down to room temperature. This material was used as a material of Example 4.

Synthesis Example of Porous Graphenes

Natural graphite and NaNO$_3$ were first mixed together in a flask. After that, H$_2$SO$_4$ (100 ml, 95% conc.) was added to the flask on an ice bath while being stirred. Potassium permanganate (8 g) was slowly added to the flask to avoid overheating. The resultant suspension was then stirred at room temperature for 2 h. The color of the suspension became bright brown. Then, distilled water (90 ml) was added to the flask with stirring. The temperature of the suspension quickly reached to 90° C. and the color changed to yellow. The diluted suspension was then stirred at 98° C. for 12 h. H$_2$O$_2$ (30 ml of 30%) was then added to the diluted suspension. The liquid medium was substituted with 5% HCl and then deionized water several times for rinsing. After that the suspension was centrifuged at 4000 rpm for 6 min. After filtration and drying in a vacuum, the graphite oxide was obtained as black powders. Thus synthesized graphite oxide was then subjected to a thermal shock at 400° C. within 20 min in N$_2$ atmosphere and followed by a mild oxidation in dry air at 500° C. for 30 min to activate the surface the sample to make porous graphene precursor. In the next step, the precursor was heated in N$_2$ atmosphere to 1000° C. with 5° C./min and kept the temperature for 6 h for a complete reduction of the precursor into porous graphenes.

Thus obtained porous graphenes included a single-layer graphene, and had 100 pores per μm$^2$ and the pore size was 46 nm.

Example 5

The carbon material obtained in Example 1 was mixed with the porous graphenes obtained in the above synthesis example in a mixer. The mixing ratio of the carbon material and the porous graphenes was 98:2 in terms of mass. Thus obtained porous graphene coated oxygen-containing carbon material was used as Example 5. The thickness of the layer of porous graphenes was about 5 nm. The particle size of the oxygen-containing carbon coated with porous graphenes layer is 16 μm.

Table 1 shows results of the elemental analysis for each carbon material. The oxygen and carbon content of the core parts can be evaluated from this analysis.

Table 2 shows interlayer spaces and crystal sizes of Comparative Example 1, and Example 1.

TABLE 1

| Examples | Element weight percentage (%) | | | |
|---|---|---|---|---|
| | C | N | H | O |
| Comparative Example 1 | 99.7 | <0.3 | <0.3 | 0.6 |
| Comparative Example 2 | 94.3 | <0.3 | <0.3 | 5.7 |
| Example 1 | 88.7 | <0.3 | 0.3 | 7.7 |
| Example 2 | 89.8 | <0.3 | 0.3 | 6.3 |
| Example 3 | 87.8 | <0.3 | 0.3 | 9.8 |
| Example 4 | 85.0 | <0.3 | <0.3 | 11.9 |
| Example 5 | 88.7 | <0.3 | 0.3 | 7.7 |

The data are the raw data of elemental analysis without any corrections. It may happen that the sum of the appearance elements is not 100%.

TABLE 2

| | Items | Comparative Example 1 | Example 1 |
|---|---|---|---|
| Interlayer Space | $d_{002}$ (002) | 0.3357 | 0.3401 |
| | $d_{002}$ (004) | 0.3355 | 0.3400 |
| | $a_0$ (110) | 0.2462 | 0.2450 |
| | $d_{112}$ (112) | 0.1156 | 0.1154 |
| Crystal Size | $L_c$ (002) | 118 | 49 |
| | $L_c$ (004) | 81 | 27 |
| | $L_a$ (110) | 573 | 30 |
| | L (112) | 19 | 2.78 |

The results in Example 1 indicate expanded interlayer spaces and reduced crystal size in comparison with pristine graphite of Comparative Example 1. The interlayer space of $d_{002}$ is larger than 0.3357 nm and the crystal size can be reduced 30% or more with respect to the original crystal size.

Table 3 shows results of XPS (X-ray photoelectron spectroscopy) analysis. As can be seen from XPS results, the C—O is the main contribution of the oxygen containing instead of C═O or O—C═O. It can be learned that Examples 1 and 4 have the O—C═O content of 1 wt %, however, Comparative Examples 1 and 2 have the O—C═O content less than 1 wt %. Since the core part is less likely to be modified with the functional group, the O—C═O content of Comparative Examples 1 and 2 will correspond to the O—C═O content in the core part of Examples 1 and 4. Therefore, it is concluded that the O—C═O content in the core part of Examples 1 and 4 is lower than the O—C═O content in the surface. The carbon and oxygen content of the carbon surface can be analyzed by the XPS. The XPS analysis was carried out by 15 nm depth.

TABLE 3

| | Comparative Example 1 (wt %) | Comparative Example 2 (wt %) | Example 1 (wt %) | Example 4 (wt %) |
|---|---|---|---|---|
| C | 97.4 | 93.6 | 88.2 | 87.2 |
| O | 2.1 | 6.4 | 11.8 | 12.8 |
| Na | 0.2 | 0.0 | <0.3 | <0.3 |
| S | 0.3 | 0.3 | <0.3 | <0.3 |

TABLE 3-continued

|  | Comparative Example 1 (wt %) | Comparative Example 2 (wt %) | Example 1 (wt %) | Example 4 (wt %) |
| --- | --- | --- | --- | --- |
| O—C=O | <1 | <1 | 1 | 1 |
| C=O | 2 | 1 | 2 | 3 |
| C—O | 3 | 5 | 7 | 8 |
| C—C, C=C, CHx | 95 | 93 | 90 | 89 |

Fabrication of Test Cell

Each sample of the carbon materials, carbon black, carboxymethyl cellulose (CMC) and styrene-butadiene rubber (SBR) were mixed in a weight ratio of 91:3:4:2 and the resultant mixture were dispersed in pure water to prepare negative slurry.

The negative slurry was coated on a Cu foil as a current collector, dried at 120° C. for 15 min, pressed to 45 μm thick with a load of 80 g/m$^2$ and cut into 22×25 mm to prepare a negative electrode. The negative electrode as a working electrode and a metal lithium foil as a counter electrode were stacked by interposing porous polypropylene film there between as a separator. The resultant stack and an electrolyte prepared by dissolving 1M LiPF$_6$ in a mixed solvent of ethylene carbonate (EC) and diethyl carbonate (DEC) in a volume ratio of 3:7 were sealed into an aluminum laminate container to fabricate a test cell. The anode materials were also characterized in full cell. The cathode slurry which coated on Al foil is made of lithium iron phosphate, carbon black, PVDF with the weight ratio of 87:6:7.

The test cell was evaluated in initial charge capacity, coulombic efficiency, and rate capability Table 4 shows capacity, coulombic efficiency and rate capability in each full cell.

TABLE 4

|  | Capacity (mAh/g) | Coulombic Efficiency (%) | Rate Capability (%) | | | |
| --- | --- | --- | --- | --- | --- | --- |
|  |  |  | 1 C/ 0.1 C | 6 C/ 0.1 C | 8 C/ 0.1 C | 10 C/ 0.1 C |
| Comparative Example 1 | 365 | 91 | 94 | 67 | 53 | 36 |
| Comparative Example 2 | 424 | 45 | 85 | 64 | 52 | 42 |
| Example 1 | 622 | 59 | 89 | 79 | 76 | 72 |
| Example 2 | 523 | 57 | 89 | 72 | 71 | 63 |
| Example 3 | 589 | 50 | 86 | 76 | 73 | 69 |
| Example 4 | 541 | 51 | 86 | 70 | 65 | 58 |
| Example 5 | 623 | 64 | 89 | 80 | 78 | 75 |

Comparative Example 2 showed larger capacity due to higher oxygen content compared with Comparative Example 1. However, it suffers from low coulombic efficiency and poor rate capability. Example 1 with hierarchical distribution of oxygen showed much larger capacity and better rate capability than Comparative Example 2. The 1 C/0.1 C, 6 C/0.1 C, 8 C/0.1 C and 10 C/0.1 C mean the ratio of capacity charging in 1 C, 6 C, 8 C and 10 C, respectively to the capacity charging in 0.1 C. Examples 1 to 5 were worse in rate capability in low rate such as 1 C due to the decay of the high oxygen-containing materials. However, they showed much better rate capability in high rate, such as 6 C, 8 C and 10 C than Comparative Example 1 and 2. Finally, Example 5 with porous graphene coating showed the best performance.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

FIG. 2 is the $^{13}$C-NMR of example 1. The sample was prepared with mixture of KBr. There is no peak detected in a range of 10-60 ppm indicate no aliphatic carbon (no content of aliphatic carbonyl or ketone). So it can be concluded the content of in-plane functional groups in the carbon materials is less than 1 mol %. Moreover, aromatic carbon (Ar—C) was detected in the range of 100-150 ppm. In addition, 5 mol % aromatic oxygen (Ar—O) was detected.

FIG. 3 is the 7Li-NMR spectroscopy of 1$^{st}$ SOC50, 1$^{st}$ SOC100, 1$^{st}$ DOD50, 1$^{st}$ DOD100, 2$^{nd}$ SOC50, 2$^{nd}$ SOC100 of example 1. SOC means state of charge, DOD means depth of discharge. The numbers of 50 and 100 are percentages, i.e., half and full, respectively. As shown in charts a and b, the full charged example 1 only showed low density lithium intercalation, LiCx (18≤x≤27). And there is no peak detected near 260 ppm, which means no metal lithium formed even full charged. According to this analysis, it is indicated that the anode material of the present invention has good safety.

Figure 4:
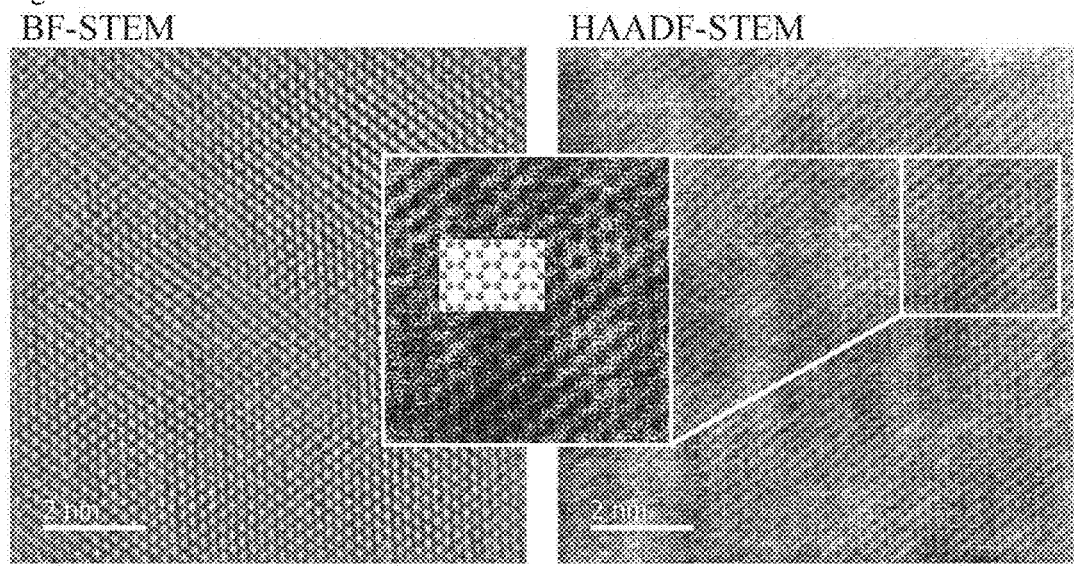
FIG. 4 shows BF-STEM and HAADF-STEM images of the material in Example 1.

FIG. 4 is BF-STEM (Blight-field Scanning Transmission Electro Microscopy) and HAADF-STEM (High Angle Annular Dark-Field Scanning Transmission Electron Microscopy) image of example 1. This image showed there is no in-plane defect such as pores on the graphene layers. The HAADF-STEM has an elemental contrast of material surface; it showed that there is no in-plane oxygen containing functional group. Therefore, it can be learned that the functional groups are only attached on the edge of the graphene layers.

Figure 5:
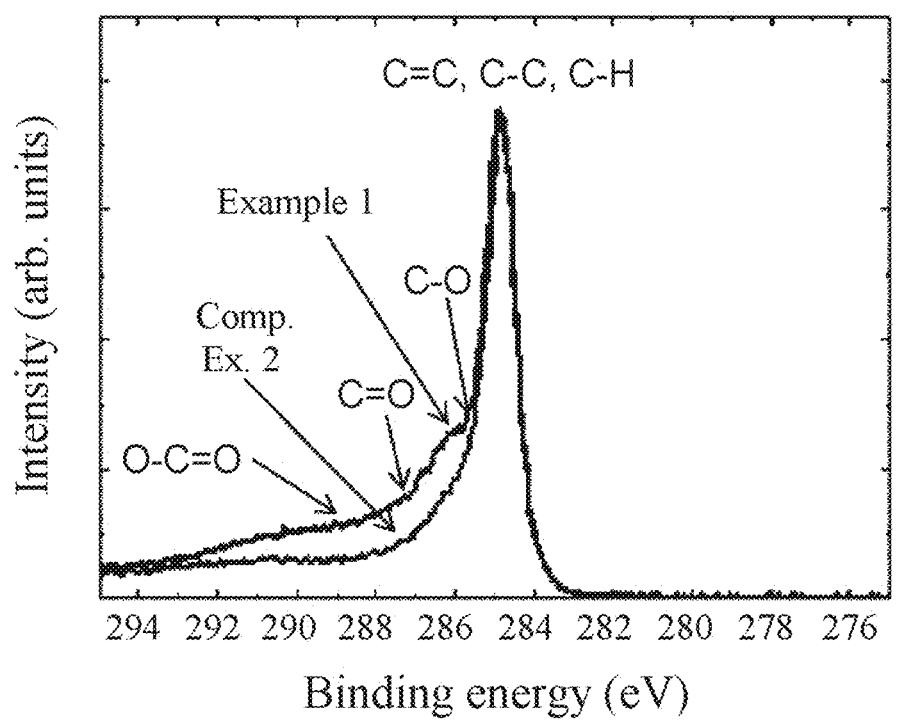
FIG. 5 shows the HAXPES results of materials in Comparative Example 2 and Example 1.

FIG. 5 is a diagram of the HAXPES (hard X-ray photoemission spectroscopy) analysis for the materials of Comparative Example 2 and Example 1. It can be learned from the XPS result in Table 3 that the material of Comparative Example 2 has less than 1 wt % of oxygen content at the surface while the material of Example 1 has 1 wt % oxygen content at the surface. However, the HAXPES result with the information from the inside of the carbon particles showed Comparative Example 2 has low O—C=O content but Example 1 has a much larger peak of O—C=O. It is indicated that the invented materials has a low content of O—C=O at the surface but higher content inside of the carbon particles.

REFERENCE SIGNS LIST

1A: Raw carbon
1B: Oxygen-containing carbon
1C: Heat treated oxygen-containing carbon
1D: Oxygen containing carbon with air injection.
2: Porous graphene
3: Final material (Anode material)

The invention claimed is:

1. An anode material for a lithium ion battery, comprising a carbon particle,
wherein the carbon particle contains oxygen in the form of functional groups and a content of oxygen is hierarchically distributed in a surface region from the outermost surface of the carbon particle to 15 nm depth with 8.5 wt % to 13.0 wt % and in a remaining inner region with 6.0 wt % to 12.0 wt %, the oxygen content in the surface region is larger than the oxygen content in the inner region; and wherein the carbon particle includes graphite phase with an interlayer space $d_{002}$ larger than 0.3357 nm.

2. The anode material according to claim 1, where the functional groups include O—C═O group and a content of the O—C═O group in the surface region is in a range from 0.3 wt % to 3 wt % and the content of the O—C═O group in the remaining inside region is lower than the content in the surface region.

3. The anode material according to claim 1, further comprising porous graphene covering on the surface of the carbon particle, the porous graphene being in a form of monolayer or few-layer graphenes.

4. The anode material according to claim 3, wherein the porous graphene is formed as a layer with a thickness from 1 nm to 50 nm the porous graphene has 5 to 500 pores per $\mu m^2$, and the size of the pore is in a range from 5 nm to 500 nm.

5. The anode material according to claim 3, wherein the carbon particle covered with the porous graphene has a particle size of 10 μm to 25 μm.

6. The anode material according to claim 1, wherein the anode material does not generate $LiC_x$ (6≤x≤12) when lithium ions are full intercalated.

7. The anode material according to claim 1, further comprising a thin layer of carbon on the outermost surface of the anode material.

8. The anode material according to claim 1, wherein the content of the functional groups attached on in-plane of an aromatic skeleton constituting graphene in the graphite phase is less than 1 mol % per the aromatic skeleton.

9. A lithium ion battery comprising positive and negative electrodes, where the negative electrode comprises the anode material according to claim 1.

10. A process for fabricating an anode material for a lithium ion battery, which the process comprises:
    (a) preparing a starting carbon particle;
    (b) wet oxidizing the starting carbon particle by acid treatment and alkaline compound treatment;
    (c) heat treating the carbon particle oxidized in (b) at 500-1000° C. for 1-24 hours under an inert atmosphere;
    (d) injecting air with flow rate of 1 to 10 L/min into the atmosphere in (c) so as to cool down to room temperature; and
    (e) mixing the carbon particle cooled in (d) with porous graphenes to obtain a porous graphene covered carbon material.

11. A lithium ion battery comprising positive and negative electrodes, where the negative electrode comprises the anode material according to claim 2.

12. A lithium ion battery comprising positive and negative electrodes, where the negative electrode comprises the anode material according to claim 3.

13. A lithium ion battery comprising positive and negative electrodes, where the negative electrode comprises the anode material according to claim 4.

14. A lithium ion battery comprising positive and negative electrodes, where the negative electrode comprises the anode material according to claim 5.

15. A lithium ion battery comprising positive and negative electrodes, where the negative electrode comprises the anode material according to claim 6.

16. A lithium ion battery comprising positive and negative electrodes, where the negative electrode comprises the anode material according to claim 7.

17. A lithium ion battery comprising positive and negative electrodes, where the negative electrode comprises the anode material according to claim 8.

* * * * *